US008738726B2

(12) United States Patent
Hayashi

(10) Patent No.: US 8,738,726 B2
(45) Date of Patent: May 27, 2014

(54) DATA PROCESSOR, DATA PROCESSING SYSTEM, DATA PROCESSING METHOD, AND COMPUTER PRODUCT, WITH ERROR MESSAGE DISPLAY

(75) Inventor: Masahiro Hayashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1571 days.

(21) Appl. No.: 11/501,761

(22) Filed: Aug. 10, 2006

(65) Prior Publication Data

US 2007/0061340 A1 Mar. 15, 2007

(30) Foreign Application Priority Data

Aug. 24, 2005 (JP) ................. 2005-242592

(51) Int. Cl.
*G06F 15/16* (2006.01)
(52) U.S. Cl.
USPC ......................... 709/217; 709/225
(58) Field of Classification Search
USPC .................... 709/225, 217; 707/10
See application file for complete search history.

(56) References Cited

U.S. PATENT DOCUMENTS

| 5,261,043 | A | * | 11/1993 | Wolber et al. | ........... | 715/809 |
| 6,185,563 | B1 | * | 2/2001 | Hino | ........... | 1/1 |
| 6,263,407 | B1 | * | 7/2001 | Arimilli et al. | ........... | 711/144 |
| 7,359,897 | B2 | * | 4/2008 | Singh et al. | ........... | 707/770 |
| 2002/0184216 | A1 | * | 12/2002 | Chandrasekaran et al. | ...... | 707/8 |
| 2003/0229609 | A1 | | 12/2003 | Haugh | | |
| 2004/0267920 | A1 | * | 12/2004 | Hydrie et al. | ........... | 709/223 |
| 2005/0108300 | A1 | * | 5/2005 | Findleton et al. | ........... | 707/203 |
| 2006/0212533 | A1 | * | 9/2006 | Vedula | ........... | 709/217 |
| 2006/0235894 | A1 | * | 10/2006 | Rasmussen et al. | ........... | 707/200 |
| 2006/0277160 | A1 | * | 12/2006 | Singh et al. | ........... | 707/3 |

FOREIGN PATENT DOCUMENTS

| JP | 2003-85024 A | 3/2003 |
| JP | 2003-337813 A | 11/2003 |

OTHER PUBLICATIONS

Norio Kimura, "Research on a Network File System," Open Design, No. 5, 2nd Ed., CQ Publishing Corp., Japan, Jun. 20, 1996, pp. 25-37.
Brent Callaghan, "WebNFS-Supporting Internet," UNIX Magazine, No. 5, vol. 12, ASCII Corp., Japan, May 1, 1997, p. 89.

* cited by examiner

*Primary Examiner* — Harunur Rashid
(74) *Attorney, Agent, or Firm* — Dickstein Shapiro LLP

(57) ABSTRACT

A data processor (client PC) is connected to a document data management apparatus (server PC) that manages the location of document data listed in a document data list. The data processor displays the document data list, and inquires the document data management apparatus about the location of document data. The data processor compares the location of the document data with that indicated in the document data list. When the two locations do not match, the data processor denies operation on the document data.

7 Claims, 5 Drawing Sheets

DATA PROCESSOR, DATA PROCESSING SYSTEM, DATA PROCESSING METHOD, AND COMPUTER PRODUCT, WITH ERROR MESSAGE DISPLAY

CROSS-REFERENCE TO RELATED APPLICATIONS

The present document incorporates by reference the entire contents of Japanese priority document, 2005-242592 filed in Japan on Aug. 24, 2005.

BACKGROUND OF THE INVENTION

1. Field of the Invention

The present invention relates to a technology for a multi-client-support client-server type document management system.

2. Description of the Related Art

In a document management system that is used by a plurality of client Personal Computers (PC) in a network, a document management server stores therein data to be displayed in the form of a list or the like on the display screen of each client PC. Some of the client PCs may refer to a list containing the same data in the document management server. In this case, a user of a client PC is not informed in real-time of changes in attributes or status of the-data caused by another user, and is not able to carry out optimal operation on the data in the list.

For example, suppose that the document management server includes multiple storages. If a user A transfers any data stored in a storage 1 to another storage 2, a user B who is referring to a list containing the data is not aware that the data has been transferred by the user A to the storage 2 because the list referred to by the user B indicates that the data is still stored in the storage 1. Due to this, the user B performs operation on the data as it is in the storage 1.

In a technology disclosed in Japanese Patent Laid-Open Publication No 2003-337813, a client-server type document management system includes a client PC and a document management server that are connected via a network. The document management server includes a notifying unit that allows, when management contents at a server side are changed by a client PC, a document manager to easily learn the change of the management contents. In a technology disclosed in Japanese Patent Laid-Open Publication No 2003-85024, a document management program and method are applied to a server connectable to a network for updatably managing a document file in the server on a World Wide Web (WWW) system.

As described above, in a document management system that is used by multiple client PCs on a network, a document management server stores therein data to be displayed in the form of a list or the like on the display screen of each client PC. Some of the client PCs may refer to a list containing the same data in the document management server. In this case, a user of a client PC is not informed in real-time of changes in attributes or status of the data caused by another user, and is not able to carry out optimal operation on the data in the list.

One approach to the problem is to send a message, from the document management server to each client PC, informing that a client PC has transferred data in the document management server. With the message, each client PC can update the list. However, there are document management systems in which the document management server does not issue such a message or the client PC is not able to process the message issued from the document management server. Thus, there is a need of a technology for allowing each client PC to voluntarily confirm status of data in the document management server.

SUMMARY OF THE INVENTION

It is an object of the present invention to at least partially solve the problems in the conventional technology.

According to an aspect of the present invention, a data processor that is connected via a network to a data management apparatus that manages data and location of the data, includes a data managing unit that manages a data list containing location of at least some data managed by the data management apparatus, a communicating unit that obtains first location information of a first data listed in the data list from the data management apparatus a comparing unit that compares the first location information with second location information of the first data in the data list, and a controlling unit that denies operation on the first data when the first location information differs from the second location information.

According to another aspect of the present invention, a data processing method applied to a data processor that is connected via a network to a data management apparatus that manages data and location of the data, includes managing a data list containing location of at least some data managed by the data management apparatus, obtaining first location information of a first data listed in the data list from the data management apparatus, comparing the first location information with second location information of the first data in the data list, and denying operation on the first data when the first location information differs from the second location information.

According to still another aspect of the present invention, a data processing system includes a data management apparatus that manages data and location of the data, and a data processor that is connected to the data management apparatus via a network. The data processor includes a data managing unit that manages a data list containing location of at least some data managed by the data management apparatus, a communicating unit that obtains first location information of a first data listed in the data list from the data management apparatus, a comparing unit that compares the first location information with second location information of the first data in the data list, and a controlling unit that denies operation on the first data when the first location information differs from the second location information.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings. Although the present invention is described with respect to specific embodiments for a complete and clear disclosure, the invention in its broader aspects is not limited to the specific details and representative embodiments shown and described herein.

Figure 1:
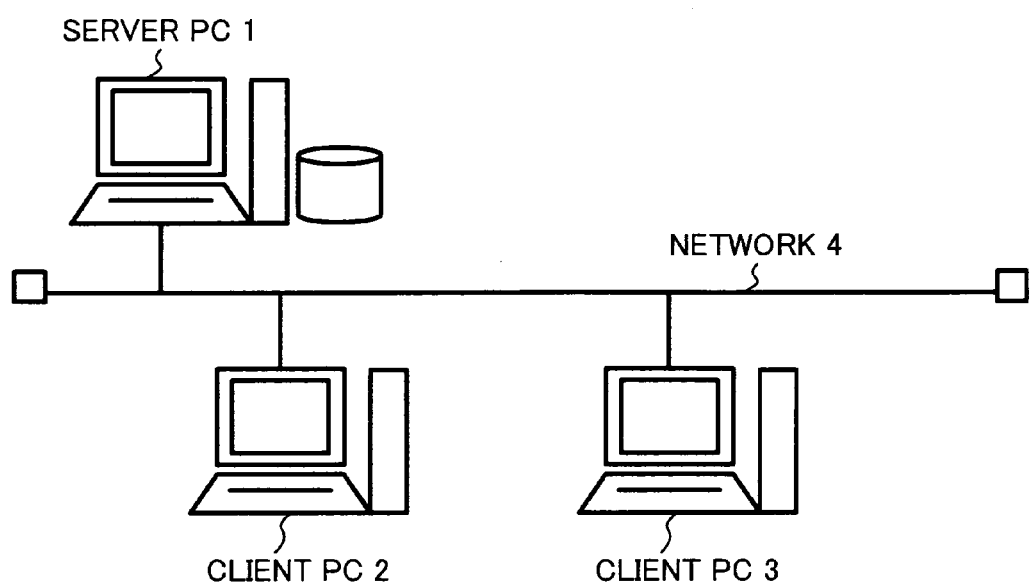
FIG. 1 is a schematic of a data processing system according to an embodiment of the present invention.

FIG. 1 is a schematic of a data processing system according to a first embodiment of the present invention. The data processing system includes a document management server PC 1, a client PC 2, and a client PC 3. The document management server PC 1 stores and manages data that is shared by each client PC. The client PC 2 and the client PC 3 include a user interface function for control operation of documents that are controlled by the document management server PC 1.

The document management server PC 1, the client PC 2, and the client PC 3 are in the same network 4 such as a Local Area Network (LAN). Although two PCs: the client PC 2 and the client PC 3, are shown in FIG. 1, the data processing system can include any number of client PCs depending on how the data processing system is to be used.

Figure 2:
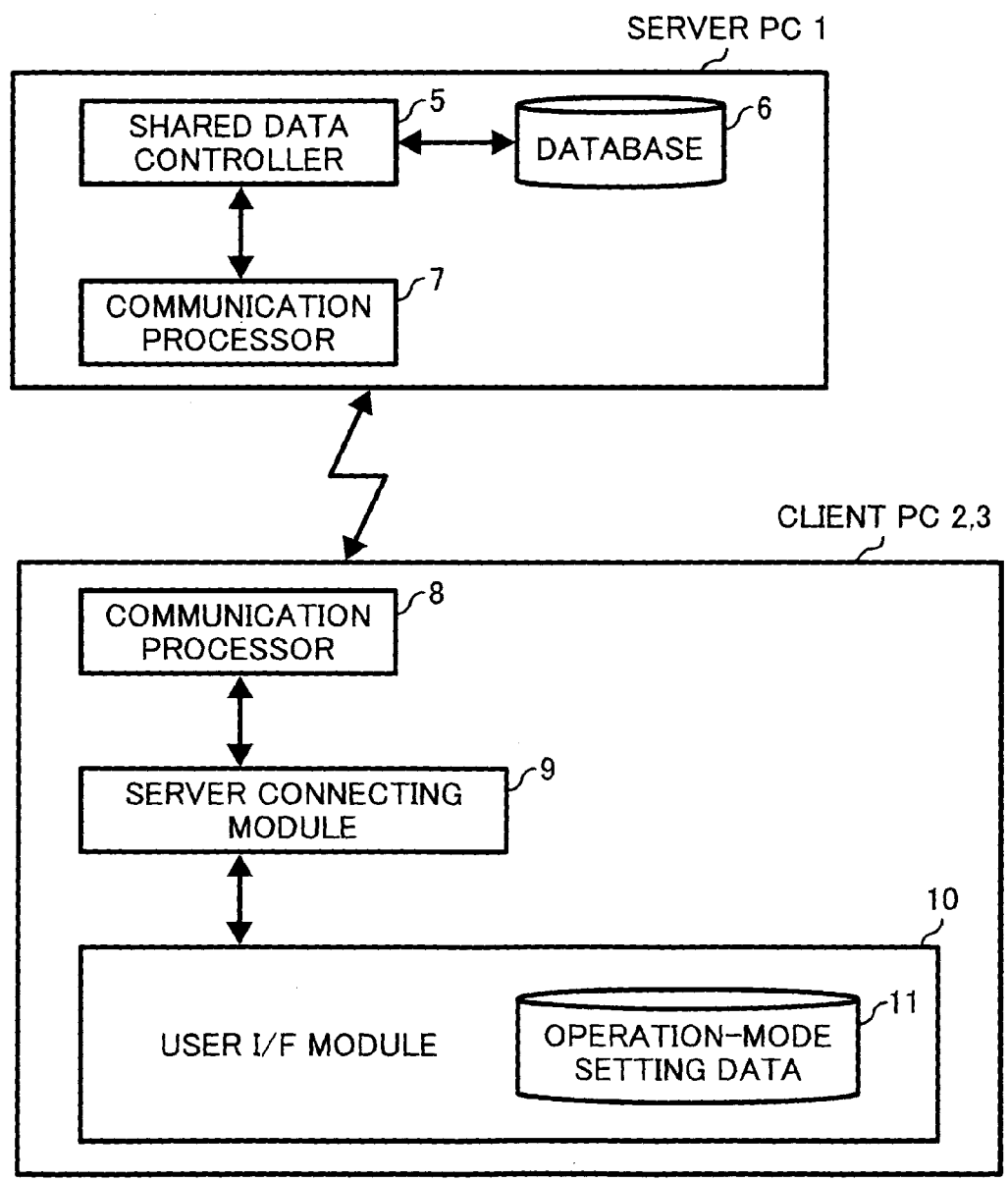
FIG. 2 is a block diagram of a server PC 1 and a client PC 2 (or a client PC 3) shown in FIG. 1.

FIG. 2 is a block diagram of the document management server PC 1 and the client PC 2 (the client PC 3). The document management server PC 1 includes a shared data controller 5, a database 6, and a communication processor 7. Due to operation of the shared data controller 5, based on a request from each client PC (the client PC 2 or the client PC 3), the document management server PC 1 stores and manages shared data in the database 6.

The shared data controller 5 receives a request from each client PC (the client PC 2 or the client PC 3) via the communication processor 7. Upon receiving the request from the client PC (the client PC 2 or the client PC 3), the shared data controller 5 searches the database 6, and transmits a necessary response to the request source client PC (the client PC 2 or the client PC 3) via the communication processor 7.

Each client PC (the client PC 2 or the client PC 3) includes a communication processor 8, a server connecting module 9, and a user interface (I/F) module 10. The user interface module 10 includes a screen display, and an input unit such as a mouse or a keyboard. The user interface module 10 fetches, via the server connecting module 9 and the communication processor 8, a list of data that are managed by the document management server PC 1 connected in the data processing system, and displays the list on the screen.

Upon receiving an instruction from a user pertaining to data that is displayed in the list, the user interface module 10 sends an operation request for the data to the document management server PC 1 via the communication processor 8 and the server connecting module 9. The user interface module 10 includes operation-mode setting data 11 for controlling the operation of the user interface module 10. The user interface module 10 operates according to the setting content. The contents of the operation-mode setting data 11 can be changed from a screen that is operated by the user.

Figure 3:
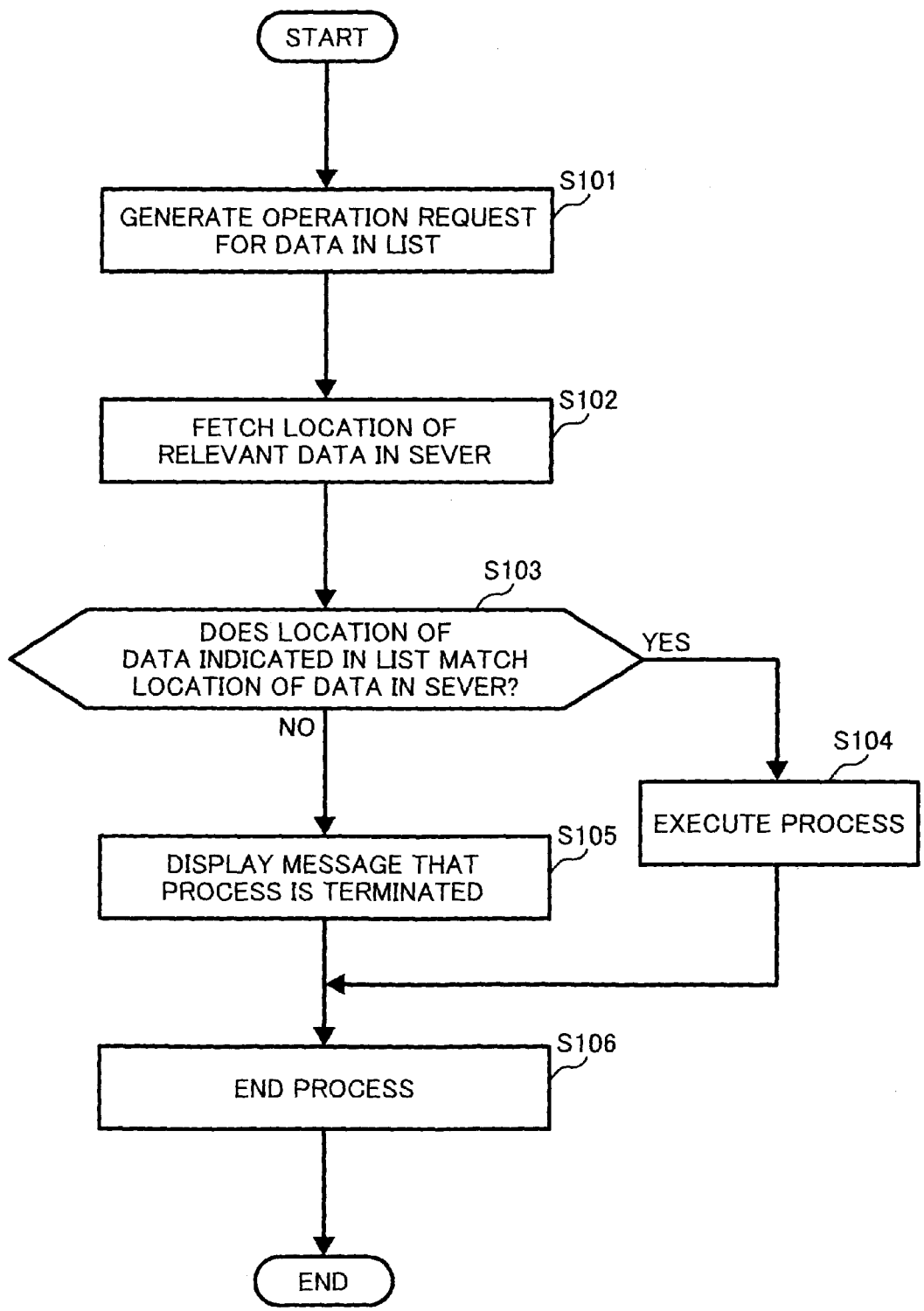
FIG. 3 is a flowchart of the operation of the client PC 2 (or the client PC 3) according to a first embodiment.

FIG. 3 is a flowchart of the operation of the client PC 2 (the client PC 3) according to the first embodiment. As shown in FIG. 3, upon issuance in the client PC 2 (the client PC 3) of an operation request regarding data in a list (step S101), the user interface module 10 inquires the document management server PC 1 about the location of the relevant data via the server connecting module 9.

Next, upon fetching data on the location of the data from the document management server PC 1 (step S102), the client PC 2 (the client PC 3) compares the location obtained from the document management server PC 1 with the location of the data that is displayed in the list (step S103). When the location of the data that is displayed in the list matches the location of the data in the document management server PC 1 (Yes at step S103), the client PC 2 (the client PC 3) performs the operation requested by the user (step S104) and terminates the process (step S106).

If the location of the data that is displayed in the list differs from the location of the data in the document management server PC 1 (No at step S103), the client PC 2 (the client PC 3) displays an error message (step S105), and terminates the process (step S106).

As described above, according to the first embodiment, in the document management system that is used by multiple client PCs in the network, the client PC 2 (the client PC 3) terminates operation requested by a user with respect to data whose location has been changed due to an operation by another client PC. Thus, it is possible to prevent an unintended process (an unnecessary process that occurs due to a user operation based on the wrong list).

A second embodiment is a modified example of the first embodiment. An explanation of the same features as in the first embodiment is not repeated, and a salient feature of the second embodiment is explained mainly with reference to FIG. 4.

Figure 4:
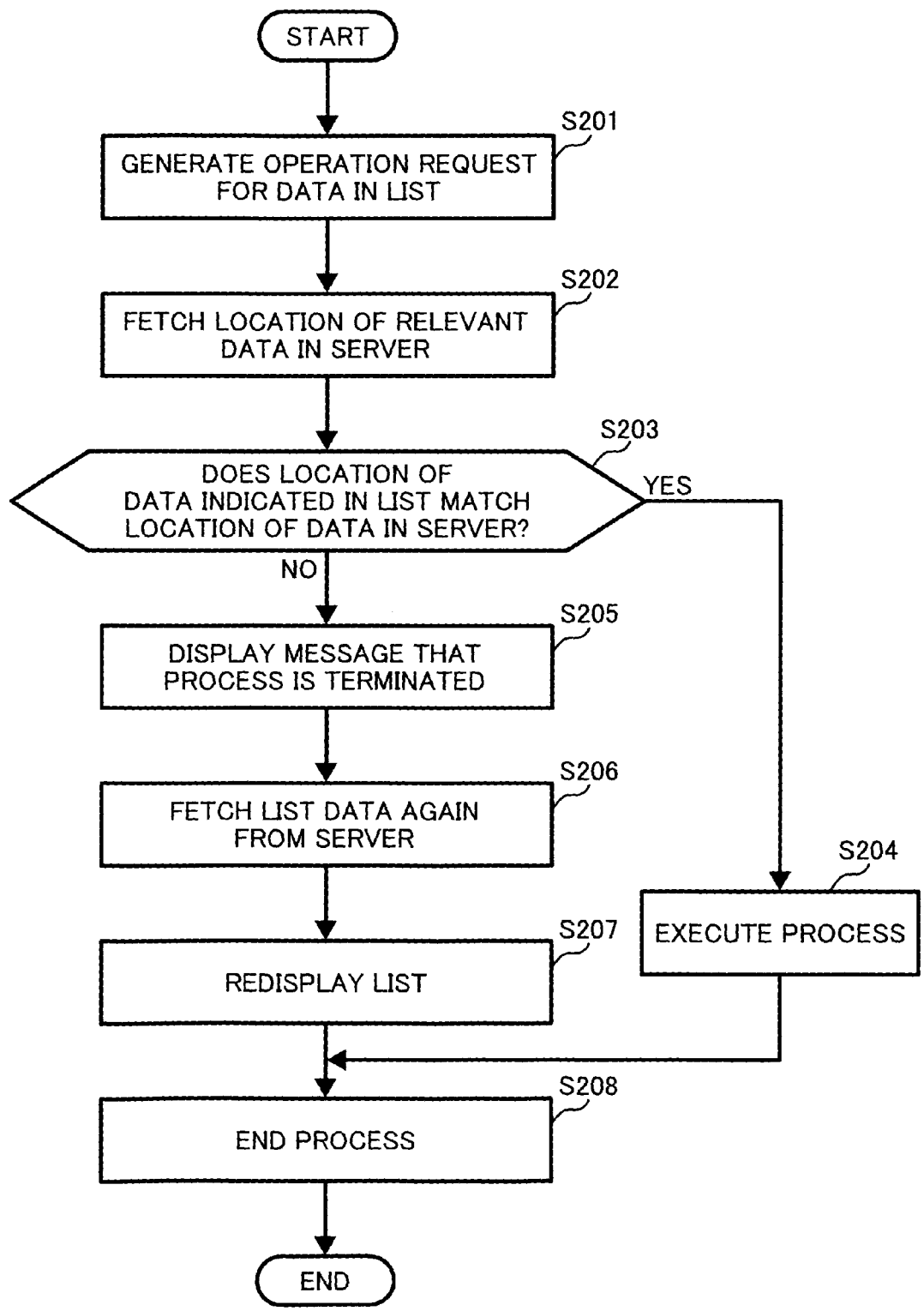
FIG. 4 is a flowchart of the operation of the client PC 2 (or the client PC 3) according to a second embodiment.

FIG. 4 is a flowchart of the operation of the client PC 2 (the client PC 3) according to the second embodiment. As in the first embodiment, if the location of data that is displayed in a-list differs from the location of the data in the document management server PC 1, the client PC 2 (the client PC 3) displays an error message and terminates the process. In addition, according to the second embodiment, the client PC 2 (the client PC 3) fetches data that is necessary for updating the list from the document management server PC 1 via the server connecting module 9 and updates the list, and redisplays an updated list.

Upon issuance in the client PC 2 (the client PC 3) of an operation request regarding data in a list (step S201), the user interface module 10 inquires the document management server PC 1 about the location of the relevant data via the server connecting module 9.

Next, upon fetching data on the location of the data from the document management server PC 1 (step S202), the client PC 2 (the client PC 3) compares the location obtained from the document management server PC 1 with the location of the data that is displayed in the list (step S203).

When the location of the data that is displayed in the list matches the location of the data in the document management server PC 1 (Yes at step S203), the client PC 2 (the client PC 3) performs the operation requested by the user (step S204) and terminates the process (step S208).

If the location of the data that is displayed in the list differs from the location of the data in the document management server PC 1 (No at step S203), the client PC 2 (the client PC 3) displays the error message (step S205). Next, the client PC 2 (the client PC 3) requests the document management server PC 1 for data that is necessary for updating the list, and the user interface module 10 fetches the data via the communication processor 8 and the server connecting module 9 (step S206).

Next, the user interface module 10 updates the list based on the data, redisplays the list (step S207), and ends the process (step S208).

According to the second embodiment, apart from the functions and effects explained in the first embodiment, the user interface module 10 has a function of redisplaying an updated list that indicates the new location of data stored in the document management server PC 1. This allows the user to confirm that the list corresponds to the storage status of the data in the document management server PC 1 without any special operation.

A third embodiment is a modified example of the second embodiment. An explanation of the same features as in the second embodiment is not repeated, and salient features of the third embodiment are explained. The third embodiment is characterized especially in that, upon issuance of an operation request regarding data in a list, before carrying out the process that is explained in the first or the second embodiment, the user interface module 10 checks contents of the operation-mode setting data 11 thereof, and determines whether the client PC 2 (the client PC 3) is in a mode to confirm the location of the data in the document management server PC 1. If the client PC 2 (the client PC 3) is in the mode to confirm the location of the data in the document management server PC 1, the client PC 2 (the client PC 3) carries out the process that is explained in the first or the second embodiment. If the client PC 2 (the client PC 3) is not in the mode, the client PC 2 (the client PC 3) immediately performs the operation requested by the user for the data in the list.

In the third embodiment, the client PC (the client PC 2 or the client PC 3) includes as a part of the operation-mode setting data 11, a flag as to whether to carry out the process to confirm the location of data in the document management server PC 1. According to the flag, the user interface module 10 determines whether to perform the process to confirm the location of data in the document management server PC 1.

Figure 5:
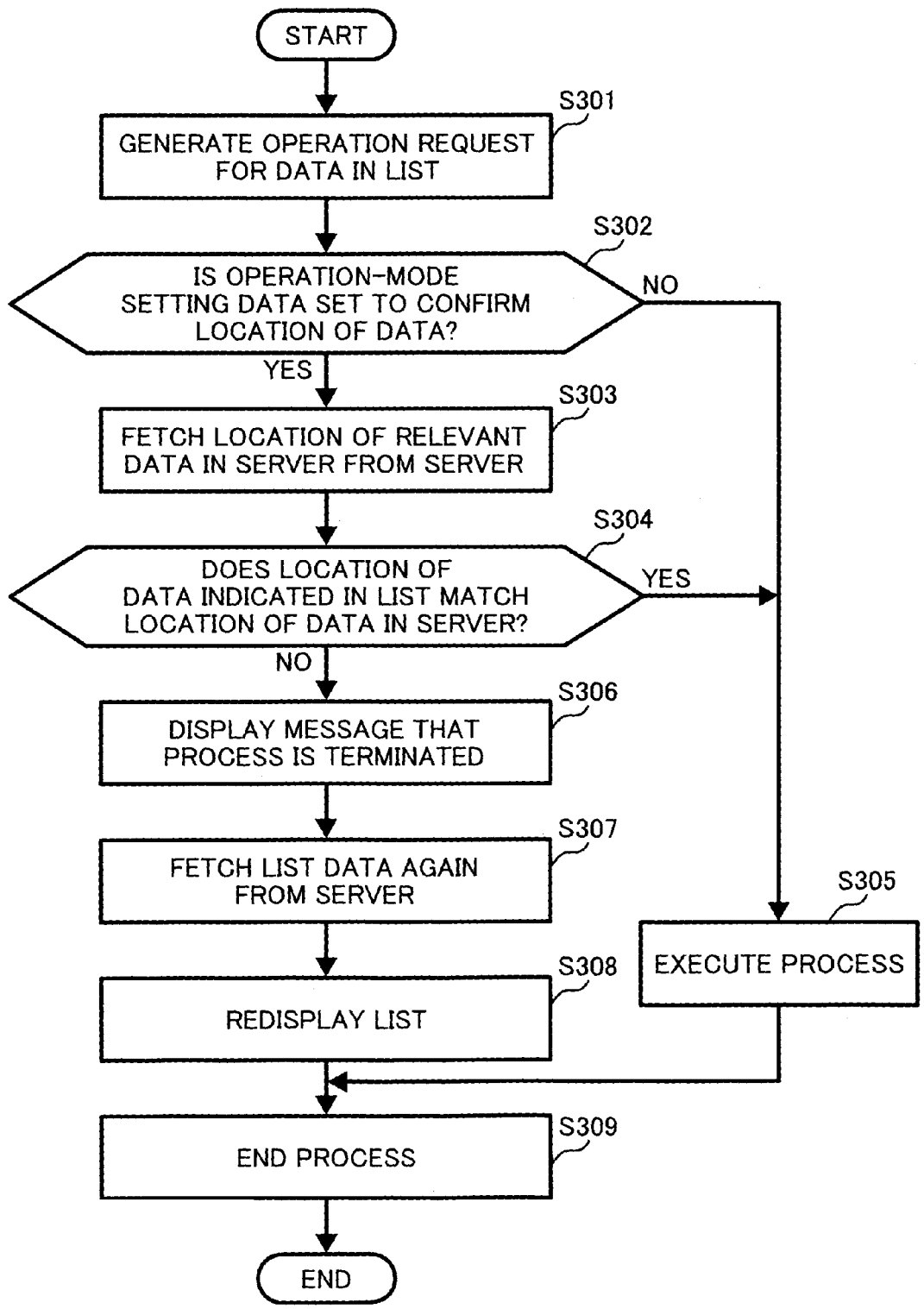
FIG. 5 is a flowchart of the operation of the client PC 2 (or the client PC 3) according to a third embodiment.

FIG. 5 is a flowchart of the operation of the client PC 2 (the client PC 3) according to the third embodiment. Upon issuance in the client PC 2 (the client PC 3) of an operation request regarding data in a list (step S301), the user interface module 10 checks whether the operation-mode setting data 11 is set to the mode to confirm the location of the data in the document management server PC 1 (step S302). If the operation-mode setting data 11 is not set to the mode (No at step S302), the user interface module 10 immediately performs the operation requested by the user (step S305) and terminates the process (step S309).

If the operation-mode setting data 11 is set to the mode (Yes at step S302), the user interface module 10 inquires the document management server PC 1 about the location of the relevant data via the server connecting module 9. Upon fetching data on the location of the data from the document management server PC 1 (step S303), the client PC 2 (the client PC 3) compares the location obtained from the document management server PC 1 with the location of the data that is displayed in the list (step S304).

When the location of the data that is displayed in the list matches the location of the data in the document management server PC 1 (Yes at step S304), the client PC 2 (the client PC 3) performs the operation requested by the user (step S305) and terminates the process (step S309).

If the location of the data that is displayed in the list differs from the location of the data in the document management server PC 1 (No at step S304), the client PC 2 (the client PC 3) displays the error message (step S306).

Next, the client PC 2 (the client PC 3) requests the document management server PC 1 for data that is necessary for updating the list, and the user interface module 10 fetches the data via the communication processor 8 and the server connecting module 9 (step S307). Next, the user interface module 10 updates the list based on the data, redisplays the list (step S308), and ends the process (step S309).

According to the third embodiment, apart from the functions and effects explained in the first and the second embodiments, the user interface module 10 can select whether to confirm the location of data in the document management server PC 1 through an operation-mode setting function of the client PC (the client PC 2 or the client PC 3).

The data processing system according to the third embodiment is advantageous when the confirmation process explained in the first and the second embodiments imposes an excessive load on the client PC depending on operation status of the data processing system. Specifically, when the process to confirm the location and attributes of data (to confirm the location of relevant data in the document management server PC 1) results in an excessive load on the client PC and interferes with the system operation, or when the confirmation process is not necessary, the client PC can spare the confirmation process.

In addition, when it has been determined that the confirmation process adversely affects the system operation, or is unnecessary, the client PC can be set to a mode such that the confirmation process is not to be performed. Thus, it is possible to realize a more effective data processing system.

Although the embodiments are described on the assumption that data is document data, document data is cited merely by way of example and without limitation. Data can be tables, images, computer programs, files for programs, directories and the like.

As set forth hereinabove, according to an embodiment of the present invention, in a document management system that is used by multiple client PCs in a network, if a location of data is changed due to operation by another client PC, user operation on the data is terminated. Thus, it is possible to prevent an unintended process, i.e., an unnecessary process that occurs due to a user operation based on the wrong list.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:
1. A data processing system, comprising:
a data processor located at a second network location;
a data management apparatus located at a first network location, wherein the second network location is different from the first network location; and
a network that connects the data processor to the data management apparatus, wherein the data management apparatus manages shared data and locations of the shared data, and the data processor stores display data that includes a data list, the data list corresponds to the shared data and locations of the shared data, and the data processor includes:
 a data managing unit that manages the data list;
 a communicating unit that obtains first location information of the shared data listed in the data list from the data management apparatus;
 a comparing unit that compares the first location information with second location information of the shared data in the data list;
 a controlling unit that denies operation on the shared data when the first location information differs from the second location information;
 a display unit that displays an error message when the first location information differs from the second location information;

an updating unit that updates the second location information in the data list with the first location information when the first location information differs from the second location information; and a user interface unit that determines whether the data processor is in a mode to confirm the first location information based on a flag information, the flag information being changeable from a screen that is operated by a user, wherein, when the data processor is in the mode, the communicating unit obtains the first location information, the comparing unit compares the first location information with the second location information, and, when the first location information differs from the second location, the user interface unit updates the data list based on the first location information obtained from the data management apparatus and redisplays the data list, and when the data processor is not in the mode, the data processor immediately performs an operation requested by a user for the shared data in the data list without obtaining the first location information from the data management apparatus or comparing the first location information with the second location information, wherein the data managing unit, the communicating unit, the comparing unit, and the updating unit are implemented by the processor.

2. The data processor according to claim 1, further comprising a determining unit implemented by the processor that checks an operation mode setting to determine whether to allow the communicating unit to obtain the first location information.

3. A data processing method applied to a data processor, at a second network location, that is connected via a network to a data management apparatus, at a first network location, different from the second network location, that manages shared data and locations of the shared data and connects to other data processors, the data processing method comprising:

managing the data list;

obtaining first location information of the shared data listed in the data list from the data management apparatus;

comparing, at the second network location, the first location information with second location information of the shared data in the data list;

denying operation on the shared data when the first location information differs from the second location information;

displaying an error message at the second location when the first location information differs from the second location information;

updating the second location information in the data list with the first location information when the first location information differs from the second location information; and determining whether the data processor is in a mode to confirm the first location information based on a flag information, the flag information being changeable from a screen that is operated by a user, wherein, when the data processor is in the mode and when the first location information differs from the second location, the method further includes updating the data list based on the first location information obtained from the data management apparatus and redisplaying the data list, and when the data processor is not in the mode, the method includes immediately performing an operation requested by a user for the shared data in the data list without obtaining the first location information from the data management apparatus or comparing the first location information with the second location information.

4. The data processing method according to claim 3, further comprising checking an operation mode setting to determine whether to obtain the first location information.

5. A computer program that causes a computer processor to implement the data processing method according to claim 3.

6. A non-transitory computer-readable recording medium that stores therein a computer program that causes a computer to implement the data processing method according to claim 3.

7. A data processing system comprising:

a data management apparatus that manages shared data and locations of the data, wherein the data management apparatus is located at a first network location; and plural data processors that are connected to the data management apparatus via a network, wherein the data processors are located at second and third network locations, different from the first location, wherein the data processors store display data that includes a data list, the data list corresponds to the shared data and locations of the shared data, and each data processor includes:

a data managing unit that manages the data list;

a communicating unit that obtains first location information of the shared data listed in the data list from the data management apparatus;

a comparing unit that compares the first location information with second location information of the data in the data list; and a controlling unit that denies operation on the shared data when the first location information differs from the second location information, wherein the data processor further includes a user interface unit that determines whether the data processor is in a mode to confirm the first location information based on a flag information, the flag information being changeable from a screen that is operated by a user, and when the data processor is in the mode and when the first location information differs from the second location, the user interface unit further updates the data list based on the first location information obtained from the data management apparatus and redisplays the data list, and when the data processor is not in the mode, the data processor immediately performs an operation requested by a user for the shared data in the data list without obtaining the first location information from the data management apparatus or comparing the first location information with the second location information, and wherein the data processor updates the second location information in the data list with the first location information when the first location information differs from the second location information, and wherein the data managing unit, the communicating unit, and the comparing unit are implemented by the processor; and wherein the data processor checks an operation mode setting to determine whether to allow the communicating unit to obtain the first location information.

* * * * *